United States Patent
Al-Hasan

(10) Patent No.: US 9,610,903 B1
(45) Date of Patent: Apr. 4, 2017

(54) CARGO MAT

(71) Applicant: Khaled Jafar Al-Hasan, Safat (KW)

(72) Inventor: Khaled Jafar Al-Hasan, Safat (KW)

( * ) Notice: Subject to any disclaimer, the term of this patent is extended or adjusted under 35 U.S.C. 154(b) by 0 days.

(21) Appl. No.: 15/056,937

(22) Filed: Feb. 29, 2016

(51) Int. Cl.
*B60R 9/00* (2006.01)
*B60R 11/00* (2006.01)

(52) U.S. Cl.
CPC ......... *B60R 11/00* (2013.01); *B60R 2011/004* (2013.01); *B60R 2011/0071* (2013.01); *Y10T 428/24273* (2015.01)

(58) Field of Classification Search
CPC .................. B60R 2011/004; Y10T 428/24273
USPC .......................................................... 410/47
See application file for complete search history.

(56) References Cited

U.S. PATENT DOCUMENTS

| | | | |
|---|---|---|---|
| 4,847,974 A * | 7/1989 | Pelfrey | B65D 19/0016 29/421.1 |
| 5,161,700 A | 11/1992 | Stannis et al. | |
| 6,224,024 B1 | 5/2001 | Fritz | |
| 6,763,985 B1 * | 7/2004 | Stephenson, Sr. | B60P 7/0892 224/403 |
| 6,827,385 B2 | 12/2004 | Mobley | |
| 7,244,084 B2 | 7/2007 | Anthony et al. | |
| 7,290,820 B1 | 11/2007 | Smith et al. | |
| D588,520 S | 3/2009 | Stewart | |
| 8,840,166 B1 * | 9/2014 | Derbes | B60R 13/01 224/403 |
| 2010/0288809 A1 * | 11/2010 | Martin | B60R 9/00 224/404 |

* cited by examiner

*Primary Examiner* — William P Watkins, III
(74) *Attorney, Agent, or Firm* — Richard C. Litman

(57) ABSTRACT

The cargo mat includes a generally flat bottom surface, a recessed top surface opposing the flat bottom surface, a first pair of parallel, opposing long sides, each long side including a plurality of long side curved portions, and a second pair of parallel, opposing short sides, each short side extending between the first pair of parallel, opposing long sides and including a short side curved portion. The cargo mat further includes a plurality of recessed portions within the recessed top surface of the cargo mat and a plurality of cavities extending from the top surface to the flat bottom surface.

6 Claims, 5 Drawing Sheets

CARGO MAT

BACKGROUND OF THE INVENTION

1. Field of the Invention

The present invention relates to portable article holders, and particularly to a flexible mat to which equipment can be secured during transport.

2. Description of the Related Art

As the hauling capacity and storage space of a flatbed pickup truck is greater than that of a car, flatbed pickup trucks are typically used by consumers for transporting gas tanks, ladders, and other large items. One drawback with using a pickup truck for transporting such items is that a pickup truck typically lacks sufficient restraint mechanisms to hold the items in place. This is especially problematic with round or cylindrical items, such as paint cans and gas tanks, which tend to roll on the bed of the pickup truck if unrestrained.

Thus, a cargo mat solving the aforementioned problems is desired.

SUMMARY OF THE INVENTION

The cargo mat includes a generally flat bottom surface, a recessed top surface, an opposing flat bottom surface, a first pair of parallel, opposing long sides, and a second pair of parallel, opposing short side. Each of the parallel, opposing short sides extends between the first pair of parallel, opposing long sides. Each long side includes a plurality of long side curved portions. Each short side includes a short side curved portion. The cargo mat further includes a plurality of recessed portions defined within the recessed top surface of the cargo mat, a plurality of cavities extending through the cargo mat, a plurality of removable inserts configured to fit into the respective cavities, and a plurality of straps to secure the equipment positioned on the mat.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
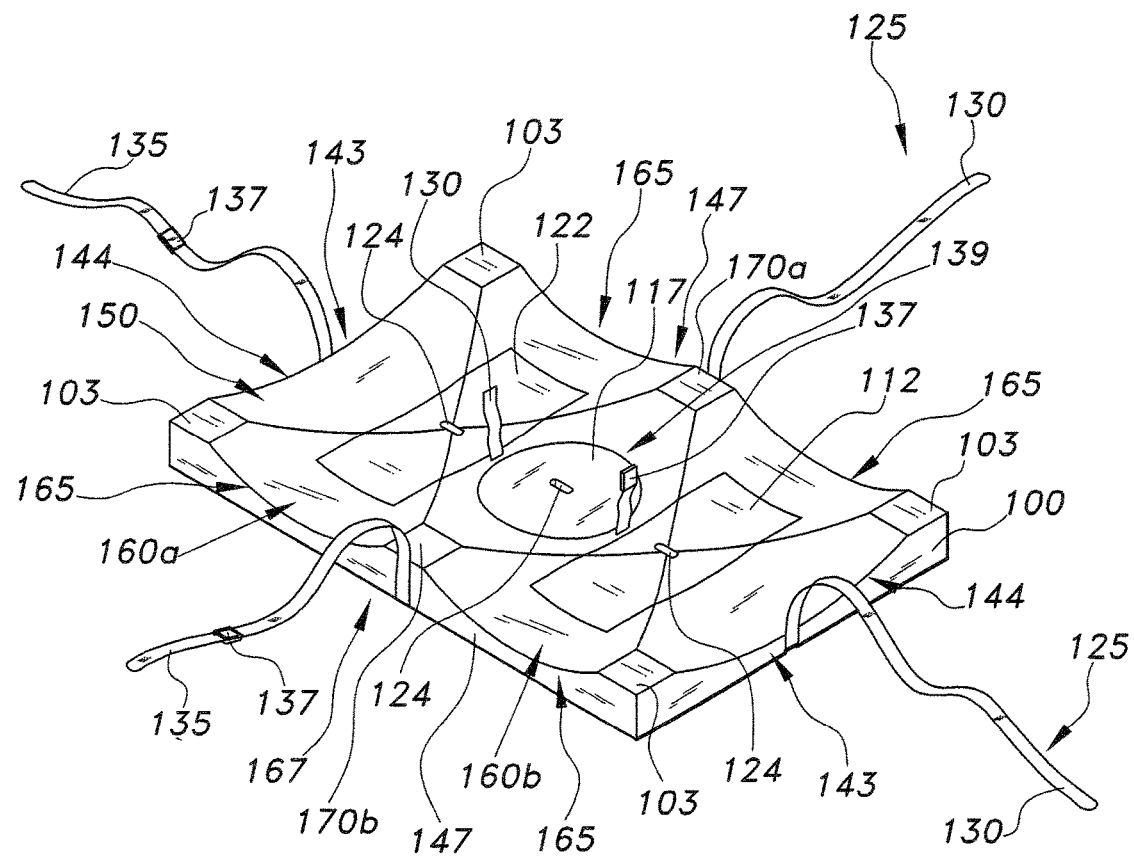
FIG. 1 is an environmental, perspective front view of a cargo mat, according to the present invention.

FIGS. 1 through 5, show a cargo mat 100 configured for receiving, stabilizing, and securing items positioned on a horizontal surface of a vehicle, such as the bed of a pickup truck. The cargo mat 100 includes a generally flat bottom surface (not shown), and a recessed top surface 150 opposing the flat bottom surface. The recessed top surface 150 includes a plurality of recessed portions, such as a first primary recess portion 160a and a second primary recess portion 160b, defined within the top surface 150 of the cargo mat 100. A plurality of cavities, such as a first cavity 110, a second cavity 115, and a third cavity 120, extend through the cargo mat, i.e., from the top surface 150 to the flat bottom surface.

The cargo mat 100 can have any suitable shape, such as a generally rectangular shape. The cargo mat 100 can include a first pair of parallel, opposing long sides 147, and a second pair of parallel, opposing short sides 143 extending between the long sides 147. The first pair of parallel, opposing long sides 147 can be longer than the second pair of parallel, opposing short sides 143. The short sides 143 connect with the long sides 147 at corner portions 103 of the cargo mat 100. Each of the long sides 147 includes a raised center portion 170a, 170b, respectively. Each corner portion 103 and each raised center portion 170a, 170b is of the same height or is equidistant from the bottom surface of the cargo mat 100.

Each long side 147 includes a plurality of long side curved portions 165 (desirably two long side curved portions 165), each long side curved portion 165 extending between and connecting the center portion 170a, 170b, respectively, with a corner flat portion 103 of the respective long side 147. Each short side 143 includes a short side curved portion 144 that extends between and connects adjacent corner flat portions 103 of the respective short side 143. Further, each of the corner portions 103 and the center portions 170a, 170b includes a flat or level surface that has a height that is greater than the long side curved portion 165 and the short side curved portion 144.

Each recess portion, such as the first primary recess portion 160a and the second primary recess portion 160b, can have any suitable shape, such as a concave shape, and is defined by a space within two opposing long side curved portions 165 and one short side curved portion 143. A circular recess portion 139 is defined between the flat central portions 170a, 170b. Both primary recess portions 160a, 160b and the circular recess portion 139 are set back from the corner flat portions 103 and the central flat portions 170a, 170b. In other words, the primary recess portions 160a, 160b and the circular recess portion 139 are closer to the opposing bottom surface than the corner flat portions 103 and central flat portions 170a, 170b.

Figure 2:
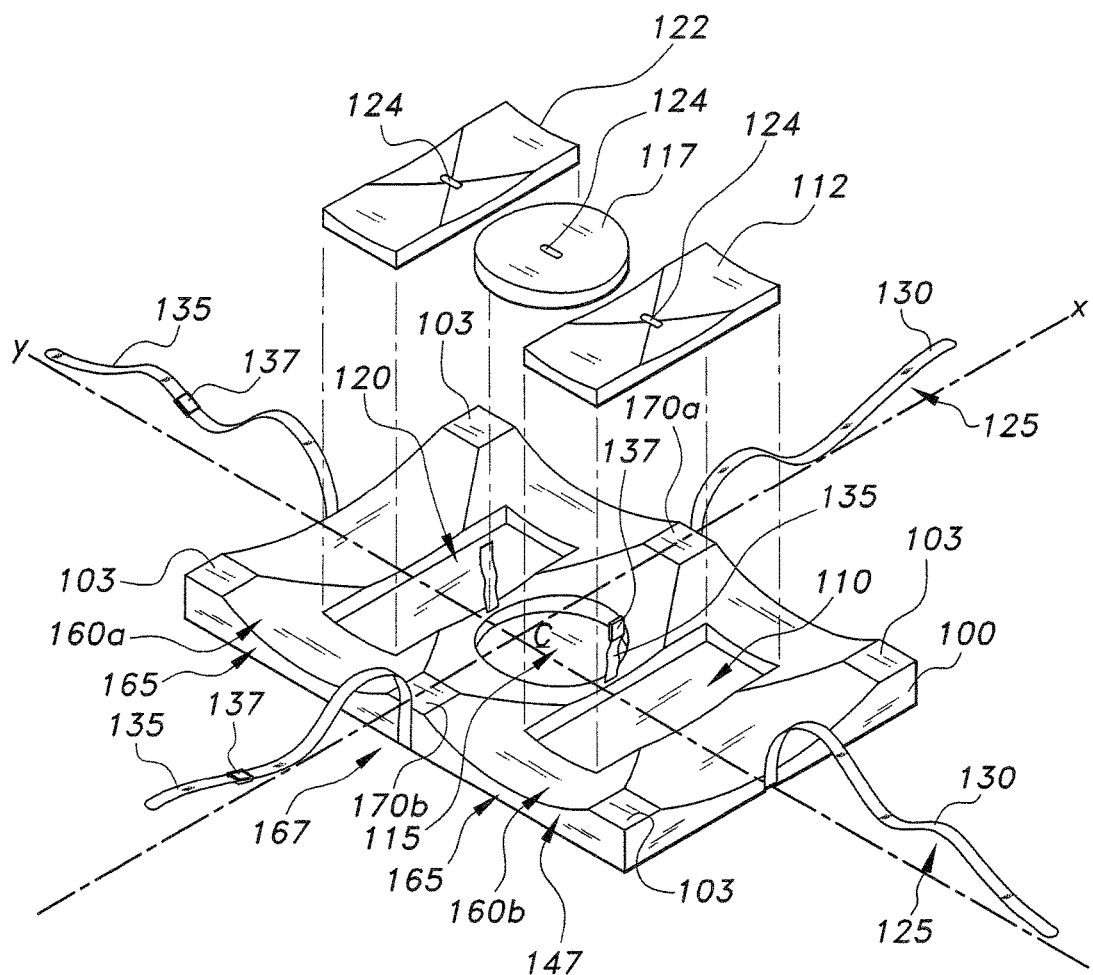
FIG. 2 is a perspective front view of a cargo mat including a plurality of cavities, each of the plurality of cavities having a corresponding insert, according to the present invention.

As illustrated in FIG. 1, the first cavity 110 can be defined within first primary recess portion 160a, the second cavity 115 can be defined within the circular recess portion 139, and the third cavity 120 can be defined within the second primary recess portion 160b. Each cavity 110, 115, 120 can have a corresponding removable insert, such as a first removable insert 112, a second removable insert 117, and a third removable insert 122, as illustrated in FIG. 2, configured for removable insertion within the corresponding cavity 110, 115, 120. Each removable insert 112, 117, 122 includes an opening 124 configured for facilitating the removal of the removable insert 112, 117, 122 from the respective cavity 110, 115, 120, as needed.

The cargo mat 100 further includes a plurality of straps 125, such as adjustable straps. Each strap 125 is configured for securing equipment positioned on the cargo mat 100, within first primary recess portion 160a and/or within second primary recess portion 160b of the recessed top surface 150 of the cargo mat 100. The straps 125 can also be used to secure equipment placed in each cavity 110, 115, 120 of the cargo mat 100 during transport. Each strap 125 includes a first end 130 and a second end 135, the second end 135 having a buckle 137 configured for receiving and securing the first end 130 of the strap 125 once the strap 125 has been adjusted to the desired length.

The cargo mat 100 can be formed from any suitable lightweight, resilient material, such as a sponge or sponge-like material. The cargo mat 100 or at least the bottom surface thereof, can include or be formed from a slip resistant material. Preferably, the cargo mat 100 is formed from reinforced sponge. The cargo mat 100 can be used to secure and transport gas cylinders, tools, or equipment, such as sports equipment, from one place to another.

Figure 3:
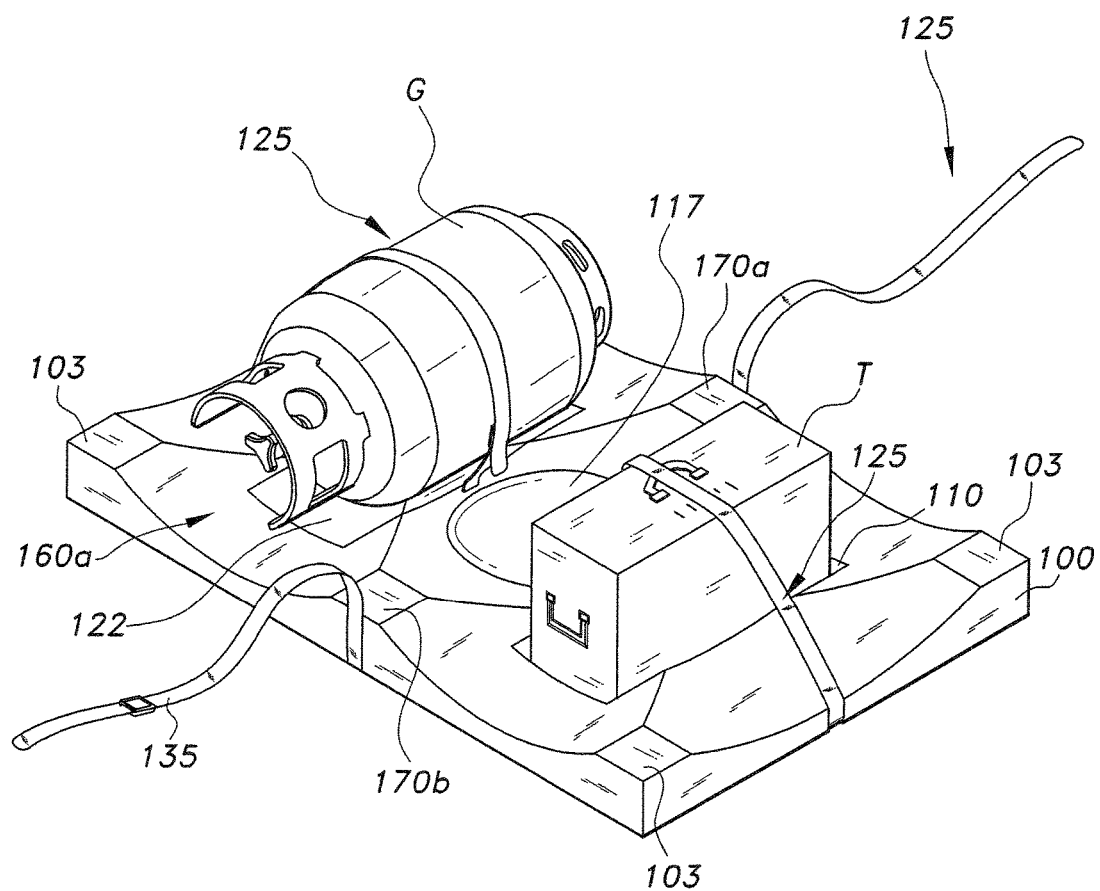
FIG. 3 is a perspective front view of a cargo mat, according to the present invention.
Figure 4:
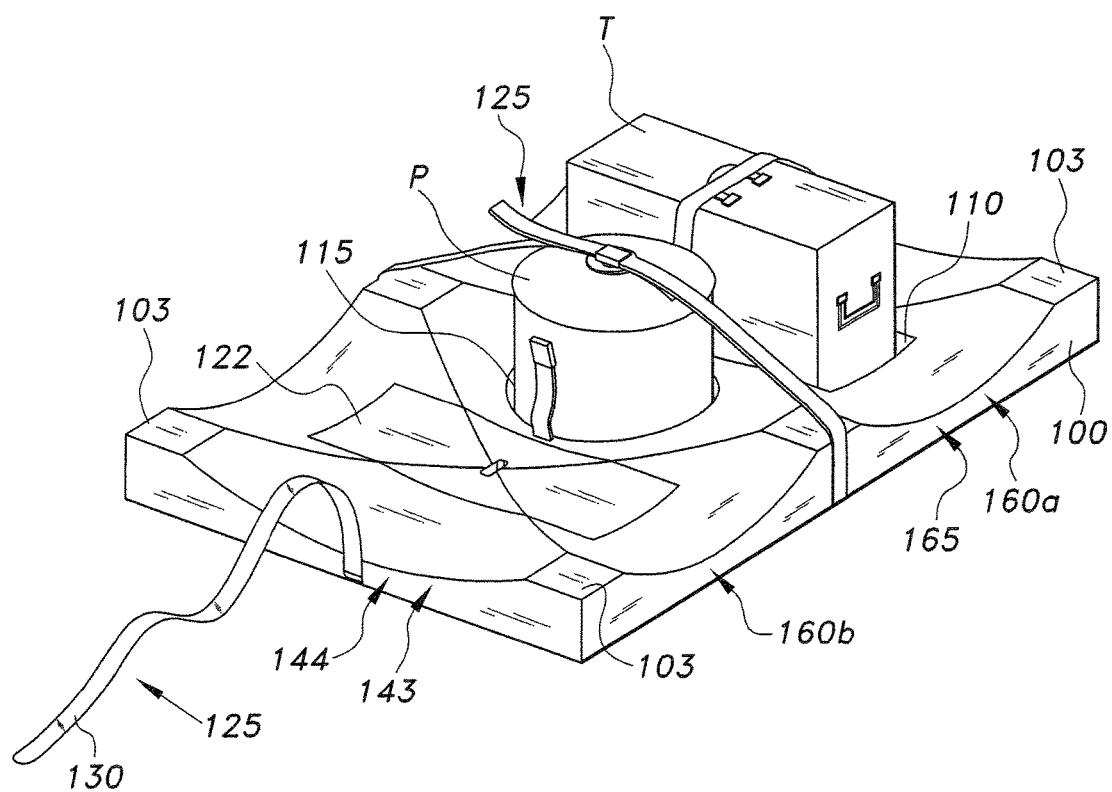
FIG. 4 is a perspective side view of a cargo mat, according to the present invention.

Each of the plurality of cavities 110, 115, 120 in the cargo mat 100 can be configured to accommodate equipment of different shapes and sizes. For example, the first cavity 110, positioned within the first primary recess portion 160a of the cargo mat 100, may have a generally rectangular configuration, suitable to fit around a toolbox T having a generally rectangular shape, as illustrated in FIGS. 3 and 4. The second cavity 115 positioned within the circular recess portion 139 of the cargo mat 100 may have a generally circular configuration having a given diameter, suitable to fit around a paint can P having a diameter smaller than the given diameter of the second cavity 115. The third cavity 110 positioned within the second primary recess portion 160b of the cargo mat 100 may also have a generally rectangular configuration, or any other desired configuration, so as to hold additional equipment.

Figure 5:
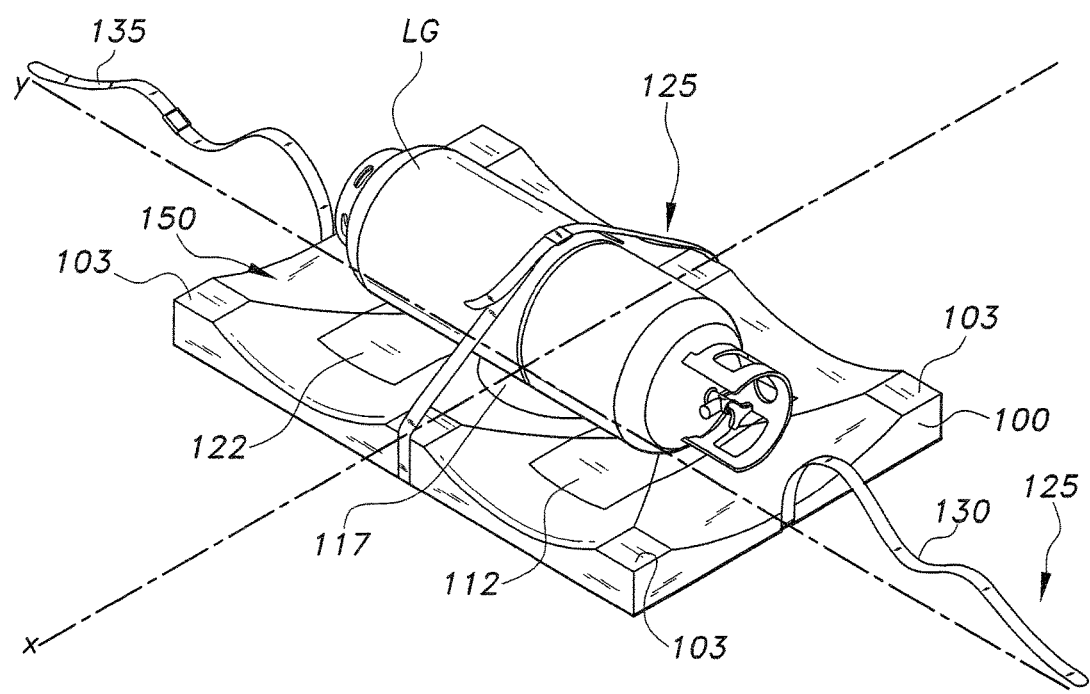
FIG. 5 is a perspective front view of a cargo mat, according to the present invention.

Equipment that is too large to fit within the cavities 110, 115, 120 or recesses of the cargo mat 100, may be positioned along the X-axis or Y-axis of the cargo mat, and secured to the mat 100 by corresponding straps 125, as illustrated in FIG. 5. Even larger equipment can be similarly stowed, with edges thereof extending beyond the short side curved portions 144 and long side curved portions 165.

It is to be understood that the present invention is not limited to the embodiments described above, but encompasses any and all embodiments within the scope of the following claims.

I claim:

1. A cargo mat, the cargo mat comprising:
   a generally flat bottom surface;
   a recessed top surface opposing the flat bottom surface;
   a pair of parallel, opposing long sides, each long side including a plurality of long side curved portions and a raised center portion;
   a pair of parallel, opposing short sides, each of the parallel, opposing short sides extending between the pair of parallel, opposing long sides, each short side including a short side curved portion;
   a plurality of recessed portions with the top surface;
   a plurality of cavities, each of the plurality of cavities extending from the top surface to the flat bottom surface; and
   a plurality of corner portions defined by the connection of the short sides and the long sides,
   wherein each corner portion and each raised center portion of the long sides having a height that is greater than the long side curved portion and the short side curved portion.

2. The cargo mat according to claim 1, further comprising a plurality of selectively removable inserts configured within each of the plurality of cavities.

3. The cargo mat according to claim 2, wherein each of the plurality of selectively removable inserts comprises an opening configured for removing the insert from the corresponding cavity.

4. The cargo mat according to claim 1, further comprising a plurality of straps coupled to the cargo mat.

5. The cargo mat according to claim 4, wherein each of the plurality of straps comprises a first end and a second end, the second end having a buckle configured for securing the first end of the strap.

6. The cargo mat according to claim 4, wherein each of the plurality of straps comprises an adjustable strap.

\* \* \* \* \*